Dec. 14, 1948.
O. C. ROESEN
2,456,149
DEVICE FOR SPLICING CABLE
Filed June 28, 1944
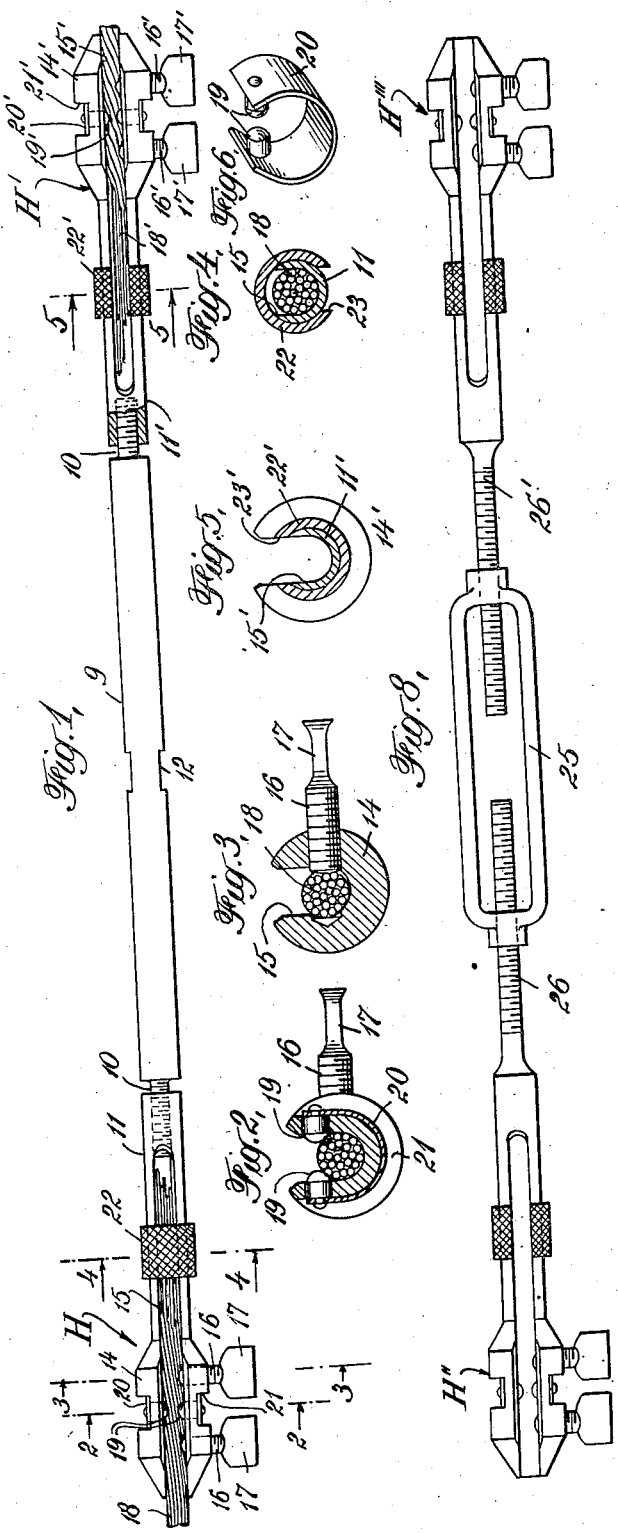
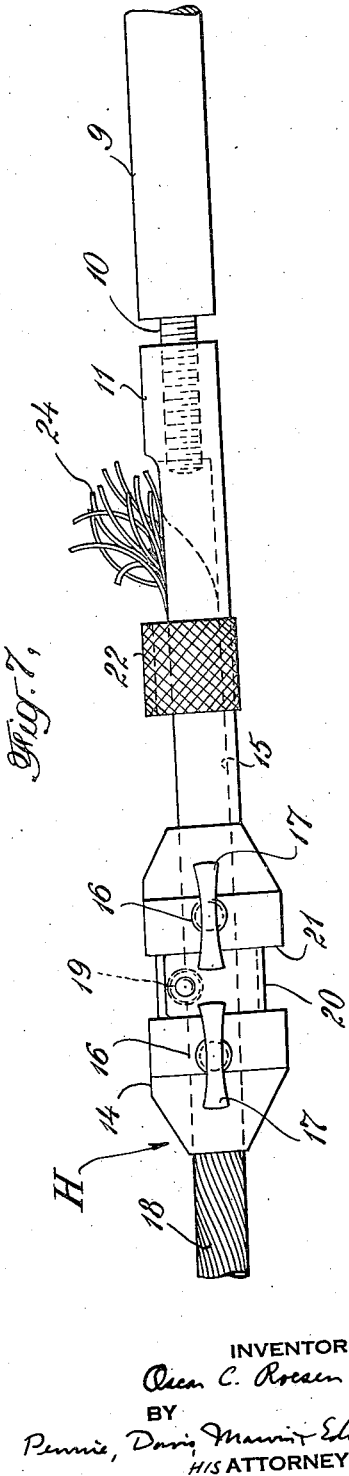
INVENTOR
Oscar C. Roesen
BY
Pennie, Davis, Marvin & Edmonds
HIS ATTORNEY Patented Dec. 14, 1948

2,456,149

UNITED STATES PATENT OFFICE 2,456,149

DEVICE FOR SPLICING CABLE

Oscar C. Roesen, Scarsdale, N. Y., assignor to Wood Newspaper Machinery Corporation, Plainfield, N. J., a corporation of Virginia Application June 28, 1944, Serial No. 542,548

8 Claims. (Cl. 287—75)

1

This invention relates to the securement or splicing of cables and more particularly concerns an improved device for quickly connecting the ends of a wire cable or like flexible tension member, the device being particularly useful in repairing such a member after it has been severed. The invention also concerns means for securing a cable end to a structural element.

Cables formed of twisted, woven or braided strands of metal wire or other material are widely used as tension members. They frequently break or become severed because of wear, accident or other causes. For example, the cables employed to move the control surfaces of aircraft such as the ailerons, elevators and rudder of airplanes, are frequently severed by enemy fire during flight, and it is essential that the ends of cables so severed be spliced together as quickly as possible in order to restore control of the aircraft to the pilot. The ends of severed cables are usually badly frayed and enlarged, and therefore difficult to handle and to splice by known means.

It is the object of the present invention to provide an improved cable splicing device which can be quickly and easily attached between the severed ends of a cable or like tension member to form a strong and durable splice therebetween. Other objects of the invention include the provision of a splicing device which is readily securable to broken cable ends that are badly frayed, or otherwise enlarged, and provision of a device of this nature which is adjustable in length and which is readily operable in the dark and in crowded or closely confined spaces. It is another object of the invention to provide an improved clamping head for securing the end of a cable to a splicing device or to any other structural member.

In describing the invention in detail, reference will be made to the accompanying drawing in which certain embodiments thereof have been illustrated. In the drawing;

Fig. 1 is a plan view of a splicing device embodying the invention;

Figs. 2, 3, 4 and 5 are respectively sectional views taken along the lines 2—2, 3—3, 4—4 and 5—5 of Fig. 1 and viewed in the direction of the arrows;

Fig. 6 is a perspective view, on an enlarged scale, of the spring pressed fingers employed in the clamping heads of the device of Fig. 1;

Fig. 7 is an elevation showing the disposition of a cable having a frayed end in a clamping head embodying the invention; and

2

Fig. 8 is a plan view of a modified form of splicing device embodying the invention.

My improved cable splicing device comprises generally a pair of clamping head members H and H' connected by a central member 9. As shown in Fig. 1, the member 9 may comprise a circular section bar having threaded ends 10 of reduced section which engage in threaded openings in the adjacent inner ends 11 and 11' of the clamping head members H and H'. The central member 9 may be furnished in a variety of lengths to permit adjustment of the distance between the clamping heads H and H', and a flattened section 12 may be provided on the member 9 for the reception of a wrench to be employed in tightening the threaded connections to the head members.

Since the clamping head members H and H' are identical, only one will be described in detail and the corresponding parts of the other will be given like reference characters with distinctive exponents. The head member H is of circular section and has an inner end portion 11 of reduced diameter and an enlarged clamping head 14. A groove 15 is formed in the member H and extends from its outer end to a point close to its inner end, as shown in Fig. 1. The groove 15 opens laterally of the device and extends somewhat below the axis thereof, as shown in Figs. 2–5 inclusive.

The enlarged clamping head 14 carries a pair of set screws 16 threaded into lateral openings which are disposed to admit the inner ends of the screws laterally across the lower portion of the slot 15, where these ends engage and clamp a cable 18, as best shown in Fig. 3. The screws 16 preferably have wing heads 17 to permit manual operation thereof.

Means are provided for holding the cable 18 in the groove 15 in a position to be engaged by the set screws 16 when the screws are tightened. In the disclosed embodiment, a pair of oppositely disposed spring pressed fingers 19 having rounded ends are employed for this purpose. As shown in Fig. 2, the fingers 19 are slidably disposed laterally of the slot 15 in aligned openings through the walls of the slot just above the position occupied by the cable 18. A spring 20 lying in a circumferential groove 21 in the head 14 biases the fingers 19 inward to the positions shown in Fig. 2, and the fingers may be riveted or otherwise suitably secured to the spring adjacent its ends as shown in Figs. 2 and 6. The spring pressed fingers 19 may be disposed between the set screws 16 as shown.

A slotted collar 22 is rotatably disposed on the inner portion 11 of the member H and is provided with a knurled exterior surface as shown. The slot 23 in the collar 22 is of approximately the same width as the cable receiving slot 15. By turning the collar 22 to the position in which the collar 22' is shown in Fig. 5, the slot 15 is open for the reception of a cable pressed laterally into the slot, and by turning the collar to the position shown in Fig. 4, it is extended over the slot to lock the cable against movement laterally out of the slot.

The parts 14' to 17' inclusive and 19' to 22' inclusive of the head member H' are identical with the parts 14 to 17 inclusive and 19 to 22 inclusive of the head H, and operate in the same manner to clamp the cable 18' to the device.

The set screws 16' of the head member H' preferably extend outwardly therefrom on the same side of the device as do the set screws 16. This permits the splicing device to be disposed close to a side wall or partition, such as the wall of the fuselage of an airplane adjacent which control cables are customarily disposed.

When a cable is severed and a quick splice is required, the operator presses an unfrayed portion of the cable 18 adjacent its severed end into the slot 15, snapping the cable down between the spring pressed fingers 19 and through the slot 23 in the collar 22. The collar 22 is then turned over the slot 15 as shown in Fig. 4. The frayed end 24 of the cable may extend out of the slot 15 near its inner end. As soon as the cable 18 is positioned in the slot as described, the set screws 16 are tightened, locking the cable in the slot 15 within the head 14. The spring fingers 19 hold the cable in proper position for engagement of the set screws 16 therewith. The described operation is then repeated with the other clamping head member H', thus completing the splice.

The longitudinally extending laterally open slot 15 of the head member permits quick and easy insertion of the cable even though its end may be badly frayed and enlarged. The operator may quickly select and clamp any convenient undamaged portion of the cable in either clamping head. Also, the operation of inserting the cable in the splicing device may be performed in the dark or in positions or locations where the operator cannot see the parts. He can readily feel the slot 15 and press the cable into it past the spring fingers 19, and after turning the collar 22, can tighten the set screws with the assurance that the cable is in position to be gripped and clamped thereby. In many applications, the collar 22 can be omitted and the spring pressed fingers 19 alone utilized to hold the cable in position to be gripped by the set screws 16.

In a modified form of the invention, illustrated in Fig. 8, a turn buckle 25 is substituted for the replaceable central member 9 of the modification described above. In this form, oppositely threaded inner end rods 26 and 26' are provided on the clamping head members H'' and H''' which are otherwise of the same construction as the members H and H' previously described. T turn buckle 25 threadedly engages the rods 26 and 26' and may be rotated to shorten the splicing device and so tighten the cable after the ends thereof have been clamped to the heads H'' and H''' in the manner described above.

Although the invention has been described in connection with a cable splicing device particularly adapted to the connection of the severed ends of cables such as the control cables employed in aircraft, it will be understood that the invention is not limited to such applications. My improved splicing device may be employed wherever cable ends are to be fastened together and my improved clamping head structure may bue used to secure cable ends to any other structural members.

I claim.

1. A device for attachment to a cable comprising an elongated head member having a longitudinally extending laterally open slot therein extending to one end thereof, at least one set screw movable into said slot transversely thereof to clamp a cable therein, and resilient means movable transversely of the slot for retaining a length of cable in said slot in a position to be gripped by said set screw.

2. A device for attachment to a cable comprising an elongated head member having a longitudinally extending laterally open slot therein, at least one set screw movable into said slot transversely thereof to clamp a cable therein, cable retaining means movable transversely of said slot for retaining a cable in said slot while said set screw is tightened and resilient means for moving said cable retaining means transversely of said slot.

3. A device for attachment to a cable comprising an elongated head member having a longitudinally extending laterally open slot therein, at least one set screw movable into said slot transversely thereof to clamp a cable therein, and a pair of spring pressed fingers extending into and movable transversely of said slot for retaining a cable in said slot while said set screw is tightened.

4. A cable clamping head comprising an elongated member having a longitudinally extending laterally open slot therein extending to one end thereof, a pair of set screws movable into said slot transversely thereof adjacent the bottom of the slot for clamping a cable in said slot, a pair of fingers having rounded ends extending into and movable transversely of said slot between said set screws adjacent the mouth of said slot and a spring for biasing said fingers to extended positions in which they retain a cable in said slot in a position to be clamped by said set screws.

5. A cable clamping head comprising an elongated member having a longitudinally extending laterally open slot therein extending to one end thereof, at least one set screw movable into said slot transversely thereof for clamping a cable in said slot, spring pressed means movable transversely of said slot for retaining a cable in said slot while said set screw is tightened, and a slotted collar rotatably mounted on said member and movable to close said slot at a point longitudinally spaced from said set screw.

6. A device for splicing a cable comprising a pair of aligned elongated clamping heads having longitudinally extending laterally open slots therein extending to the outer ends thereof, screw means for clamping cables in said slots, resiliently movable means extending transversely into said slots for retaining cables therein while said screw means are tightened, and means of variably adjustable length connecting said heads.

7. A device for splicing a cable comprising a pair of aligned elongated clamping heads having longitudinally extending laterally open slots therein extending to the outer ends thereof, screw means for clamping cables in said slots, resiliently movable means extending transversely into said slots for retaining cables therein while said screw means are tightened, and a turnbuckle connecting said heads.

8. A device for attachment to a cable comprising an elongated head member having a longitudinally extending laterally open slot therein, a pair of set screws movable into said slot transversely thereof at points spaced longitudinally of said slot to clamp a cable therein, and resilient means movable transversely of the slot between said set screws for retaining a length of cable in said slot in a position to be gripped by said set screws.

OSCAR C. ROESEN.

REFERENCES CITED

The following references are of record in the file of this patent:

UNITED STATES PATENTS

| Number | Name | Date |
|---|---|---|
| 270,478 | Pumphrey | Jan. 9, 1883 |
| 367,560 | Smith | Aug. 2, 1887 |
| 1,482,148 | Ratigan | Jan. 29, 1924 |
| 1,822,543 | Rosenmund | Sept. 8, 1931 |
| 1,879,636 | Cole | Sept. 27, 1932 |
| 1,997,430 | Peirce, Jr. | Apr. 9, 1935 |

Certificate of Correction

Patent No. 2,456,149.  December 14, 1948.

OSCAR C. ROESEN

It is hereby certified that errors appear in the printed specification of the above numbered patent requiring correction as follows:

Column 3, line 68, for "T turn" read *A turn*; column 4, line 6, for "bue" read *be*;

and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*